United States Patent
Liu et al.

(10) Patent No.: US 10,985,431 B2
(45) Date of Patent: Apr. 20, 2021

(54) BATTERY

(71) Applicant: NINGDE AMPEREX TECHNOLOGY LIMITED, Ningde (CN)

(72) Inventors: Xinchun Liu, Ningde (CN); Chunjiang Xiang, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 204 days.

(21) Appl. No.: 16/194,091

(22) Filed: Nov. 16, 2018

(65) Prior Publication Data

US 2019/0157632 A1    May 23, 2019

(30) Foreign Application Priority Data

Nov. 17, 2017   (CN) .......................... 201711147143.5

(51) Int. Cl.
| | | |
|---|---|---|
| H01M 2/02 | (2006.01) | |
| H01M 2/04 | (2006.01) | |
| H01M 2/06 | (2006.01) | |
| H01M 2/08 | (2006.01) | |
| H01M 2/10 | (2006.01) | |
| H01M 50/543 | (2021.01) | |
| H01M 50/24 | (2021.01) | |
| H01M 50/116 | (2021.01) | |
| H01M 50/124 | (2021.01) | |
| H01M 50/147 | (2021.01) | |
| H01M 50/148 | (2021.01) | |
| H01M 50/172 | (2021.01) | |
| H01M 50/183 | (2021.01) | |

(Continued)

(52) U.S. Cl.
CPC ....... *H01M 50/543* (2021.01); *H01M 50/116* (2021.01); *H01M 50/124* (2021.01); *H01M 50/147* (2021.01); *H01M 50/148* (2021.01); *H01M 50/172* (2021.01); *H01M 50/183* (2021.01); *H01M 50/24* (2021.01); *H01M 50/557* (2021.01); *H01M 50/10* (2021.01)

(58) Field of Classification Search
CPC .... H01M 2/021; H01M 2/0275; H01M 2/026; H01M 2/0287; H01M 2/0212; H01M 2/0404; H01M 2/06; H01M 2/08; H01M 2/1094; H01M 2/0469; H01M 2002/0205
See application file for complete search history.

(56) References Cited

U.S. PATENT DOCUMENTS 5,851,244 A * 12/1998 Tuttle .................. H01M 2/0222
                                                                29/623.2
6,146,785 A * 11/2000 Rigobert ............. H01M 2/0275
                                                                180/68.5

(Continued)

FOREIGN PATENT DOCUMENTS

JP            201027411    *   4/2010

*Primary Examiner* — Lisa S Park
(74) *Attorney, Agent, or Firm* — Morgan, Lewis & Bockius LLP

(57) ABSTRACT

The present disclosure relates to a battery. The battery includes an encapsulation casing, a battery cell and a sealing cover. The encapsulation casing has an opening in an end thereof. The battery cell is arranged in the encapsulation casing. The sealing cover is bonded with the end of the encapsulation casing to seal the opening.

20 Claims, 5 Drawing Sheets

(51) Int. Cl.
*H01M 50/557* (2021.01)
*H01M 50/10* (2021.01)

(56) References Cited

U.S. PATENT DOCUMENTS

| | | | | |
|---|---|---|---|---|
| 2008/0107964 A1* | 5/2008 | Choi | ............... | H01M 10/0587 |
| | | | | 429/174 |
| 2009/0297942 A1* | 12/2009 | Jang | ............... | H01M 50/528 |
| | | | | 429/178 |
| 2013/0078501 A1* | 3/2013 | Yang | ............... | H01M 50/10 |
| | | | | 429/162 |
| 2014/0038031 A1* | 2/2014 | Yong | ............... | H01M 10/4257 |
| | | | | 429/175 |

* cited by examiner

BATTERY

CROSS REFERENCE TO RELATED APPLICATION

The present application claims priority to Chinese patent application No. 201711147143.5, filed on Nov. 17, 2017, which is incorporated herein by reference in its entirety.

FIELD

The present disclosure relates to a technical field of energy storage devices, and more particularly to a battery.

BACKGROUND

A secondary battery such as a pouch lithium ion battery is widely adopted in an electronic device, as it has advantages of recyclability, high energy density, long service life, low self-discharge, no memory effect and etc. Currently, an encapsulation of the battery mainly adopts an aluminum-plastic-membrane heat seal. Specific procedures of the encapsulation are described as follows. A groove is molded in an aluminum-plastic membrane, a battery cell is put into in the groove, then the aluminum-plastic membrane is folded to cover the battery cell, and finally, edges of the two layers of the folded aluminum-plastic membrane are hot-pressed to get together, so as to form two side seal edges and one top seal edge. The formation of the seal edges causes an increased volume of the battery and a decreased volumetric energy density. The luminum-plastic membrane may have a heat-seal edge due to the heat seal. In addition, during the heat seal, as the aluminum-plastic-membrane is stretched when being subjected to heat, sharp corners are formed in portions adjacent to the heat-seal edge.

SUMMARY

The present disclosure provides a battery, which can increase an energy density of a pouch battery.

The present disclosure provides a battery. The battery includes an encapsulation casing, a battery cell and a sealing cover. The encapsulation casing has an opening in an end thereof. The battery cell is arranged in the encapsulation casing. The sealing cover is bonded with the end of the encapsulation casing to seal the opening.

The technical solution provided in the present disclosure can achieve the following beneficial effects.

In the battery provided by the present disclosure, the battery cell is accommodated in the encapsulation casing, and the sealing cover is bonded to the end of the encapsulation casing to seal the opening of the encapsulation casing. With such configurations, the opening of the encapsulation casing is no longer heat-sealed, such that the battery will not have seal edges and sharp corners caused by the heat seal, and thus the space occupied by the battery is reduced and the energy density of the battery is increased.

It should be understood that the above general description and the following detailed description are merely exemplary and cannot limit the present disclosure.

DETAILED DESCRIPTION

Figure 1:
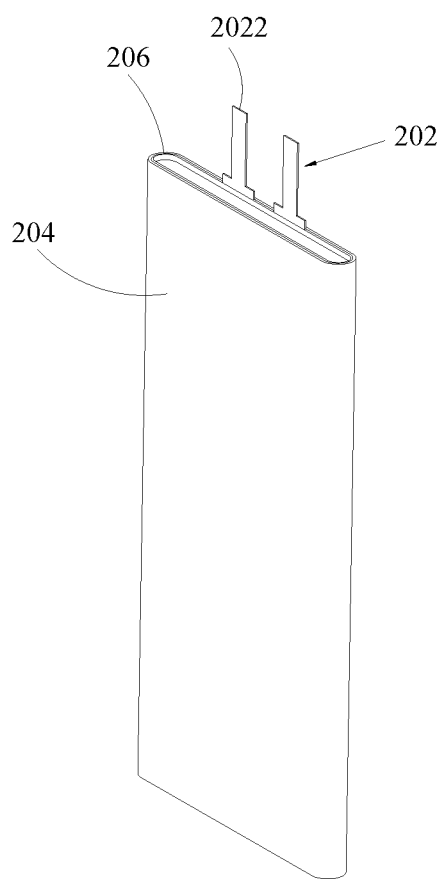
FIG. 1 is a schematic view of a battery which is partially encapsulated according to embodiments of the present disclosure.

The present disclosure will be further described in detail below through specific embodiments and in combination with the accompanying drawings.

It should be noted that locative words "upper", "lower", "left", "right" and the like described in the embodiments of the present disclosure are described in the view point of what illustrated in the drawings, and should not be construed as limitation to embodiments of the present disclosure. In addition, in the context, it is also to be understood that when an element is referred to as being provided "above" or "below" another element, the element can be directly provided "above" or "below" another element, and can also be indirectly provided "above" or "below" another element via an intermediate element.

Figure 2:
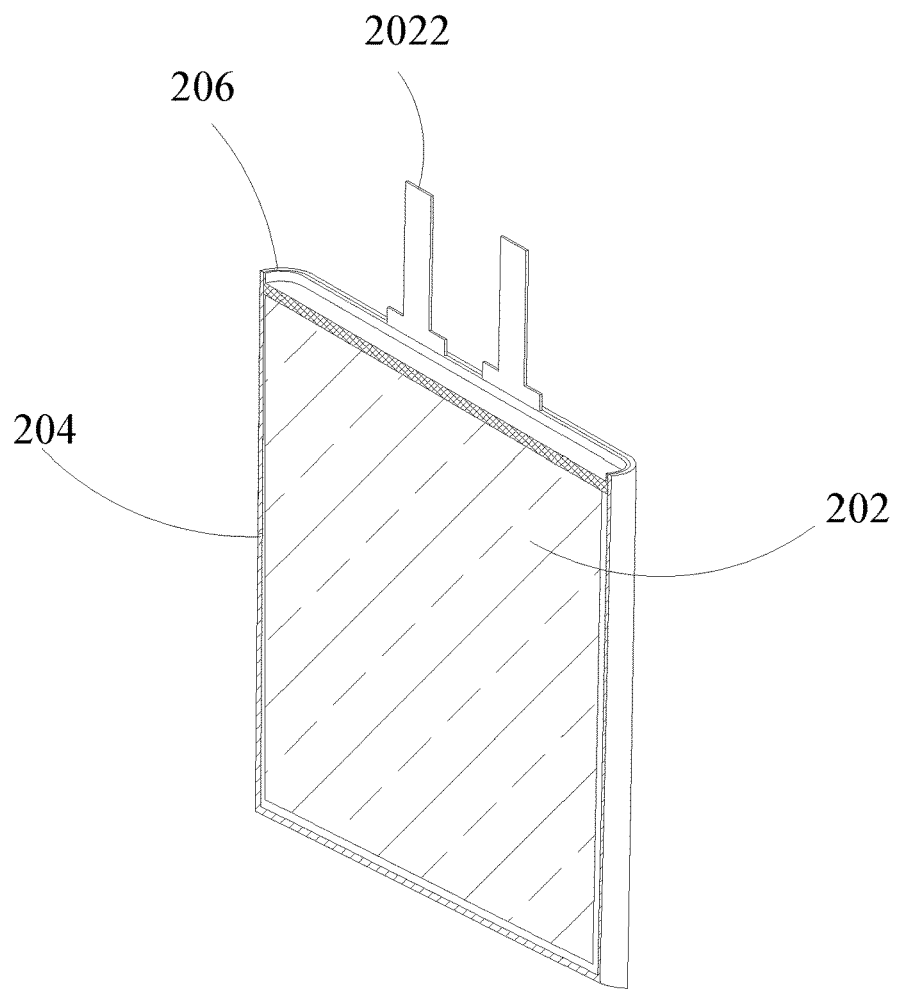
FIG. 2 is a sectional view of a battery according to embodiments of the present disclosure.

As illustrated in FIG. 1 and FIG. 2, the present disclosure provides a battery 2, and the battery 2 includes a battery cell 202, an encapsulation casing 204 and a sealing cover 206. The encapsulation casing 204 has an opening in an end thereof, and the battery cell 202 may be put in an accommodating cavity of the encapsulation casing 204 through the opening. The sealing cover 206 is disposed at the opening of the encapsulation casing 204 and seals the opening in a bonding manner.

More accurately, the battery cell 202 includes a main body and a tab 2022 protruding from the main body. When the battery cell 202 is encapsulated in the encapsulation casing 204, the main body is located in the encapsulation casing 204, and the tab 2022 protrudes out of a gap reserved in the sealing cover 206, so that electric energy stored in the main body can be output through the tab 2022.

With the sealing cover 206 being bonded to the opening of the encapsulation casing 204 and thus sealing the opening of the encapsulation casing 204, the opening of the encapsulation casing 204 will not be heat-sealed, such that seal edges and sharp corners resulted from a heat seal process are reduced, and it is not necessary to perform a folding process on the seal edges and the sharp corners when the battery is assembled to an electronic product subsequently, thus reducing space occupied by the battery and increasing an energy density of the battery.

Figure 3:
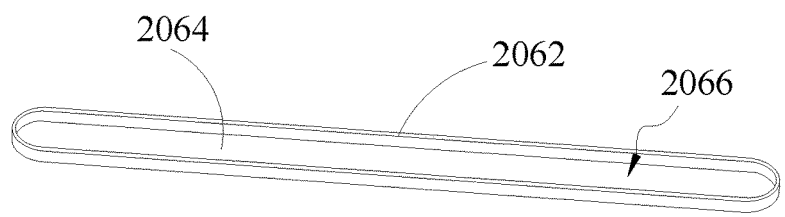
FIG. 3 is a schematic view of a sealing cover according to embodiments of the present disclosure.

As illustrated in FIG. 3, in order to guarantee the reliability of encapsulation, the sealing cover 206 includes a side wall 2062, and the side wall 2062 extends along a protruding direction of the tab 2022. With this kind of configuration, the sealing cover 206 can be bonded with an inner wall and/or an outer wall of the encapsulation casing 204 through the side wall 2062. As the sealing cover 206 has a relatively small size in thickness and hence an area of an outer circumferential surface of the sealing cover 206 is relatively small, a jointing area of the sealing cover 206 and the encapsulation casing 204 can be increased by an additional arrangement of the side wall 2062, thus ensuring a jointing strength of the sealing cover 206 and the encapsulation casing 204 and improving the reliability of sealing.

Figure 4:
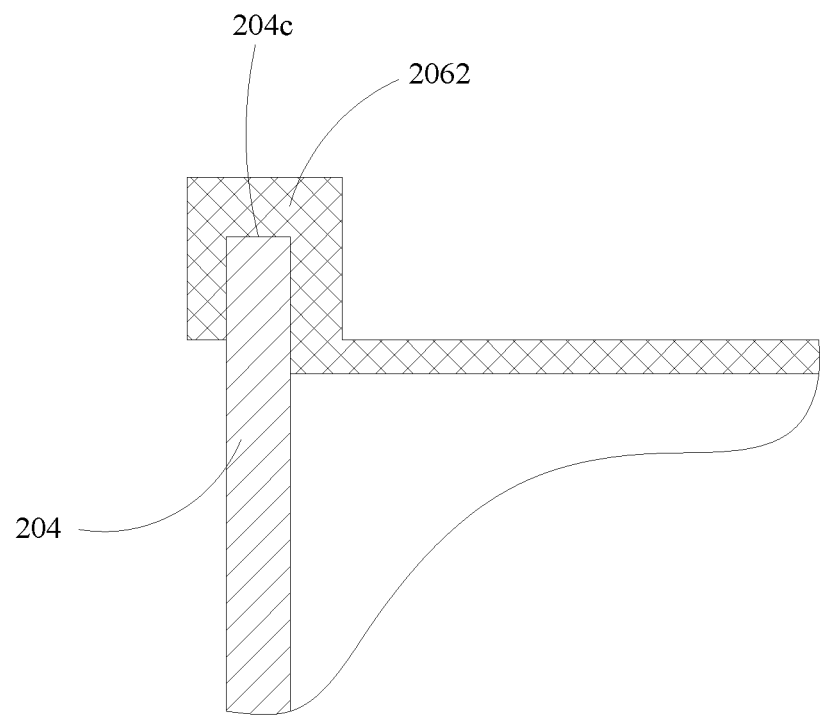
FIG. 4 is a partial sectional view of a battery according to embodiments of the present disclosure, in which a side wall of a sealing cover is bonded with an outer wall of an encapsulation casing.

Alternatively, in an embodiment, as illustrated in FIG. 4, the side wall 2062 is bonded with the outer wall of the encapsulation casing 204, in which case, the side wall 2062 is required to cross over an end surface 204c of the encapsulation casing 204 and envelops the end surface 204c of the encapsulation casing 204 in the sealing cover 206.

Figure 5:
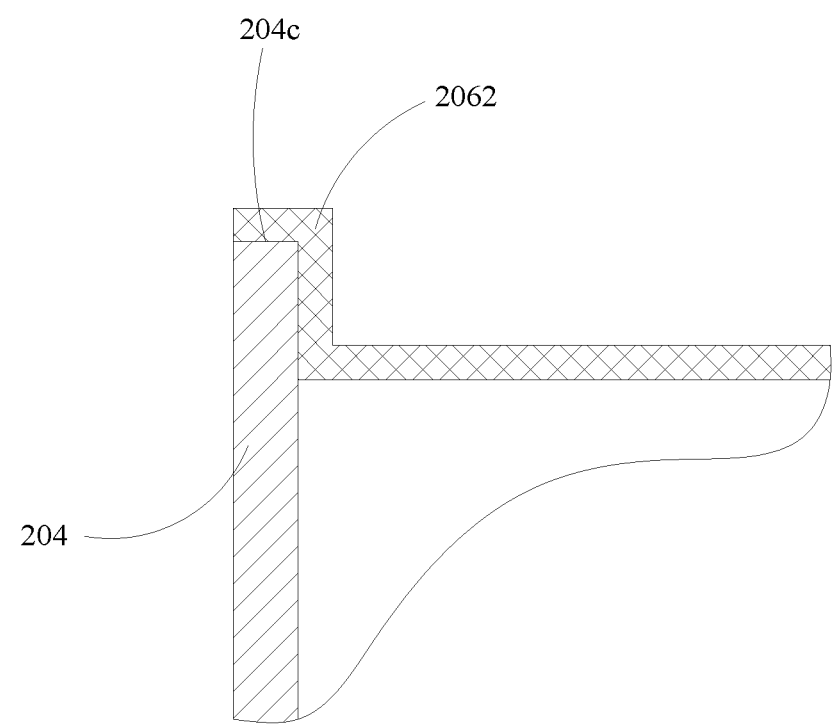
FIG. 5 is a partial sectional view of a battery according to embodiments of the present disclosure, in which a side wall of a sealing cover is bonded with an inner wall of an encapsulation casing.

In another embodiment, as illustrated in FIG. 5, the side wall 2062 is bonded with the inner wall of the encapsulation casing 204 and the side wall 2062 covers the end surface 204c of the encapsulation casing 204.

In the embodiments illustrated in FIG. 4 and FIG. 5, for the encapsulation casing 204 made of aluminum-plastic membrane materials, a condition that the end surface 204c of the encapsulation casing 204 will have a bare metal after experiencing the die cutting may occur, and by adopting the above-mentioned configurations, the bare metal can be enveloped or shielded, thus preventing a short circuit phenomenon of the battery 2.

A material of the side wall 2062 and a material of the inner wall or the outer wall of the encapsulation casing 204 can be same with each other, and as the same material has same properties, it is much easier for the heat seal and the bonding of the side wall 2062 and the inner wall of the encapsulation casing 204. In the present embodiment, polypropylene is adopted as both of the material of the side wall 2062 and the material of the inner wall or the outer wall of the encapsulation casing 204, and polypropylene has advantages of a high melting point, a corrosion resistance and a heat resistance. Certainly, in some other embodiments, the material of the side wall 2062 and the material of the inner wall or the outer wall of the encapsulation casing 204 are not limited to polypropylene.

Referring to FIG. 3 again, the sealing cover 206 further includes a cover plate 2064, the cover plate 2064 is a main body of the sealing cover 206 and covers the opening of the encapsulation casing 204, and the side wall 2062 is connected to an outer edge of the cover plate 2064 and extends along the outer edge of the cover plate 2064.

Figure 6:
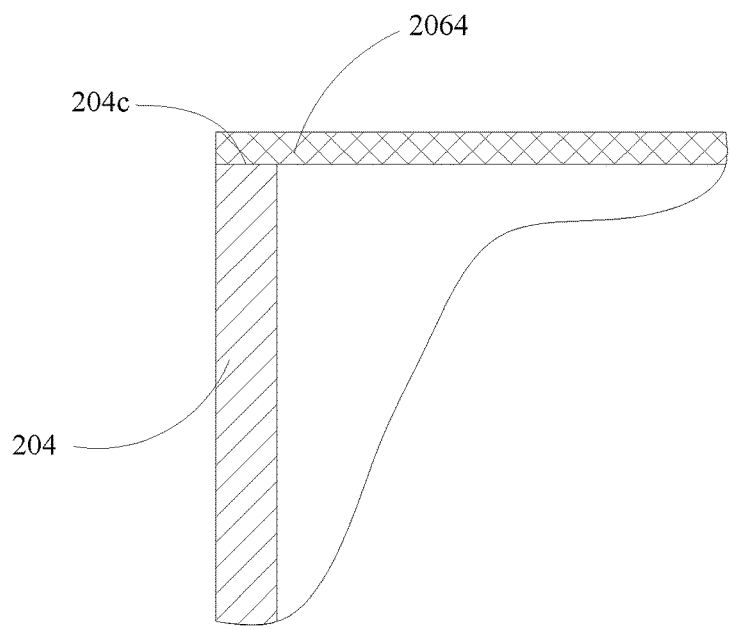
FIG. 6 is a partial sectional view of a battery according to embodiments of the present disclosure, in which a cover plate of a sealing cover is bonded with an end surface of an encapsulation casing.

In some other embodiments, as illustrated in FIG. 6, the cover plate 2064 may also be used for covering the opening of the encapsulation casing 204 and the end surface 204c of the encapsulation casing 204, so that the main body of the battery cell 202 is sealed. In the embodiment illustrated in FIG. 6, the side wall 2062 is omitted.

Referring to FIG. 3 again, the side wall 2062 protrudes from the cover plate 2064 along the protruding direction of the tab 2022. An upper surface of the side wall 2062 is higher than an upper surface of the cover plate 2064 in the protruding direction, and the side wall 2062 extends along the outer edge of the cover plate 2064, such that a groove 2066 having an upward opening is enclosed by the side wall 2062 and the cover plate 2064, the groove 2066 can be used for accommodating a hot press device, and the hot press device can be used for the hot press of the side wall 2062 and the encapsulation casing 204.

Accordingly, the structure of the sealing cover 206 ensures a reliable connection of the sealing cover 206 and the encapsulation casing 204, and also reverses a space for the hot press device, thus on one hand improving a machining process of the battery 2 and reducing the machining difficulty, and on the other hand enhancing the reliability of the battery 2 and preventing defects such as a bad sealing.

Figure 7:
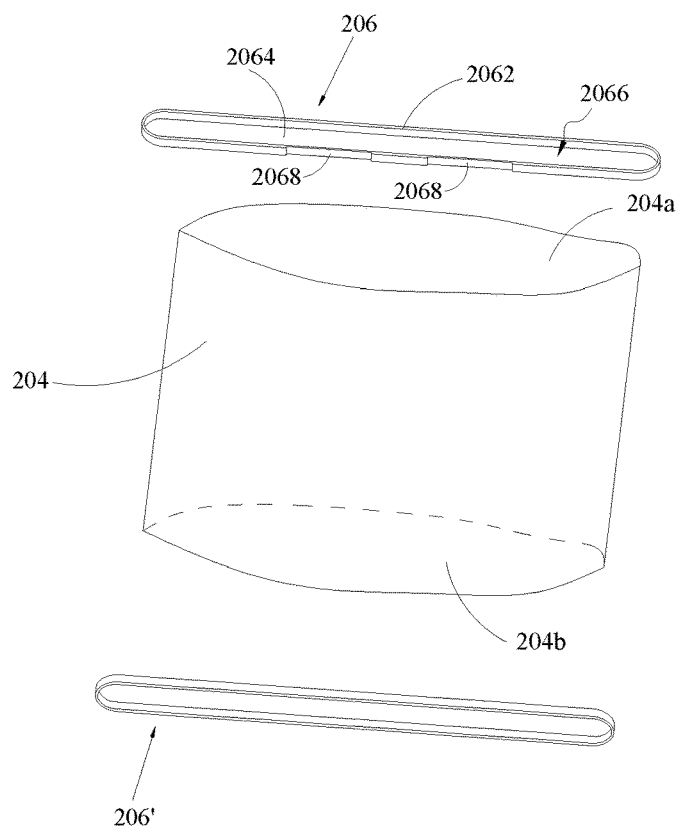
FIG. 7 is an exploded view of a battery according to embodiments of the present disclosure, in which a battery cell is removed.

As illustrated in FIG. 7, for the encapsulation casing 204, two openings i.e. a first opening 204a and a second opening 204b may be provided and disposed at two ends of the encapsulation casing 204 correspondingly. For example, the first opening 204a is provided at an upper end of the encapsulation casing 204, while the second opening 204b is provided at a lower end of the encapsulation casing 204. Correspondingly, two sealing covers 206 are provided, i.e. a first sealing cover 206 and a second sealing cover 206'. That is, the sealing cover 206 mentioned previously is the first sealing cover 206, and the other one of the two sealing cover 206 is the second sealing cover 206'. The first opening 204a is sealed by the first sealing cover 206, and the second opening 204b is sealed by the second sealing cover 206'. With such configurations, it is possible to allow both of the two ends of the encapsulation casing 204 to be free of heat-seal edges, so that the space occupied by the battery 2 is further reduced and the energy density is further increased.

As is known in the foregoing, the tab 2022 protrudes out of the gap reserved in the sealing cover 206. It is to be noted that a positive tab and a negative tab generally protrude at a same side of the main body of the battery cell, and thus the tab 2022 may protrude only out of the first sealing cover 206. Accordingly, referring to FIG. 7 again, the first sealing cover 206 is provided with a third opening 2068, the third opening 2068 is formed by recessing an edge of the first sealing cover 206 along a direction perpendicular to the protruding direction of the tab 2022, so that the third opening 2068 between the first sealing cover 206 and the encapsulation casing 204 is configured as the gap reserved in the first sealing cover 206, and the tab 2022 protrudes out of the first sealing cover 206 through the third opening 2068 (i.e. the gap).

In some embodiments of the present disclosure, when the first sealing cover 206 includes the side wall 2062, the third opening 2068 may be a notch formed in the side wall 2062. The notch runs though the side wall 2062 along the protruding direction of the tab 2022, and the notch may run through the side wall 2062 or not along the direction perpendicular to the protruding direction of the tab 2022.

Two third openings 2068 are provided, and the tab 2022 includes the positive tab and the negative tab, such that the two third openings 2068 are arranged in one-to-one correspondence with the positive tab and the negative tab. That is, the positive tab protrudes out of one of the two third openings 2068, and the negative tab protrudes out of the other one of the two third openings 2068.

The third opening 2068 is arranged at the edge of the first sealing cover 206, that is, the third opening 2068 is formed in a side surface, directly facing the encapsulation casing 204, of the first sealing cover 206.

The manufacturing process of the first sealing cover 206 can be improved by this solution, and compared with the solution in which the first sealing cover 206 defines a hole in the related art, it is more simple and convenient to provide a groove in the first sealing cover 206.

Figure 8:
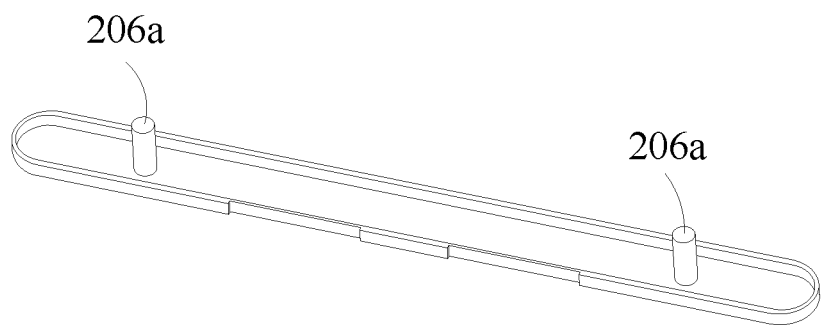
FIG. 8 is a schematic view of a first sealing cover provided with a gripping portion according to embodiments of the present disclosure.

As illustrated in FIG. 8, the first sealing cover 206 and the second sealing cover 206' are further provided with a gripping portion 206a. When the two sealing covers are to be connected to the encapsulation casing 204 in a sealing manner, it is possible to perform such manipulation by gripping the gripping portion 206a. The gripping portion 206a can be removed when the encapsulation between the two sealing covers and the encapsulation casing 204 is finished.

In the embodiment illustrated in FIG. 8, the gripping portion 206a includes two cylinders, and the two cylinders are arranged on the cover plate 2064 at interval.

In addition, in a subsequent manufacturing process of the battery, electrolyte needs to be poured into the encapsulation casing 204. In order to prevent the electrolyte from leaking, the battery 2 further includes a sealing adhesive, and the seal adhesive is arranged in the third opening 2068 and surrounds the tab 2022, so as to fill a gap between the tab 2022 and a circumferential wall defining the third opening 2068 and hence to prevent the electrolyte from overflowing through this gap.

The sealing adhesive may be an adhesive tape. Or, a glue may be coated in the gap between the tab 2022 and the circumferential wall defining the third opening 2068 and the sealing is realized after the glue is dried out.

In the present disclosure, in order to overcome a defect in the related art that the battery 2 has heat-seal edges at sides, the encapsulation casing 204 is configured as a hollow columnar structure formed by a piece of membrane. The membrane may be the aluminum-plastic membrane. The "hollow columnar structure" described herein indicates that the encapsulation casing 204 has no seam at sides, is formed in one piece and only reverses openings at two ends (referring to FIG. 7). In this way, the encapsulation casing 204 is no longer manufactured by adopting the sheet structure and the method in the related art that a groove is molded in the membrane and edges of two layers of folded membranes are hot-pressed to get together.

The manufacturing process of the battery 2 is simplified and the heat seal at sides of the battery 2 is omitted by means of the membrane having the hollow columnar structure, so that the heat-seal edges of the battery 2 are reduced and the space occupied by the battery 2 is decreased, by which decreased space, the energy density of the battery 2 can be increased.

The manufacturing process of the battery is specified in the following.

During the encapsulation of the battery 2, the battery cell 202 is first put into the hollow columnar encapsulation casing 204, and an innermost layer of the encapsulation casing 204 is provided as a PP (polypropylene) layer. Hence, the cover plate 2064 made of the same material may be adopted so as to realize better heat bonding. The gripping portion 206a is gripped so as to put the first sealing cover 206 into the first opening 204a of the encapsulation casing 204, and also, the tab 2022 is positioned in the third opening 2068. As the groove 2066 is enclosed by the side wall 2062 and the cover plate 2064, the hot press device can be arranged conveniently so as to perform a hot-press encapsulation for the encapsulation casing 204 at outside and the first sealing cover 206.

Figure 9:
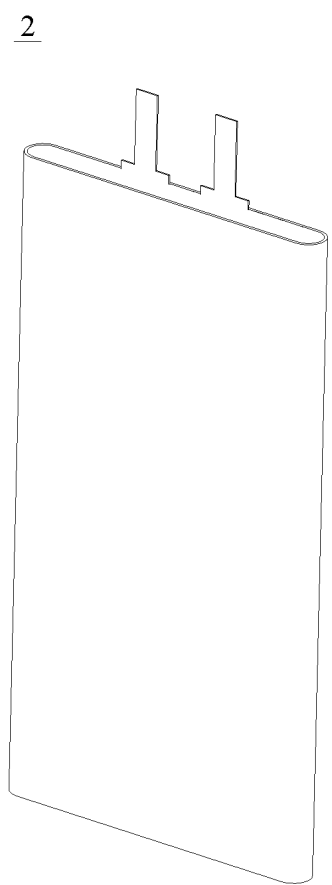
FIG. 9 is a schematic view of a battery which is completely encapsulated according to embodiments of the present disclosure.

The gripping portion 206a on the encapsulated first sealing cover 206 is removed. Liquid filling is performed through the second opening 204b of the encapsulation casing 204, and procedures such as formation is preformed when the liquid filling is finished. When the above-mentioned procedures are finished, the second sealing cover 206' seals the second opening 204b of the encapsulation casing 204 in a same way as the first sealing cover 206 seals the first opening 204a. The schematic view of the battery 2 after the encapsulation is illustrated in FIG. 9.

The above description only relates to preferred embodiments of the present disclosure, and is not intended to limit the disclosure. Various changes and modifications can be made to the present disclosure by those skilled in the related art. Any modifications, equivalents and improvements, etc. within the spirit and principles of the present disclosure shall be included in the protective scope of this disclosure.

What is claimed is:

1. A battery, comprising:
   an encapsulation casing having an opening in an end thereof;
   a battery cell arranged in the encapsulation casing;
   a tab; and
   a sealing cover bonded with the end of the encapsulation casing to seal the opening, the sealing cover further comprising:
   a cover plate arranged in the opening and covering the opening, the cover plate being an integral plate; and
   a side wall extending along an edge of the cover plate and outwardly protruding from the cover plate, and the side wall contacts an inner surface of the encapsulation casing, the side wall defines a wall opening, and the tab extends out of the battery through the wall opening.

2. The battery according to claim 1, wherein the side wall is bonded with the encapsulation casing.

3. The battery according to claim 2, wherein a material of the side wall is same with a material of at least one of an inner wall and an outer wall of the encapsulation casing.

4. The battery according to claim 3, wherein the material of the side wall and the material of the at least one of the inner wall and the outer wall of the encapsulation casing are both polypropylene.

5. The battery according to claim 2, wherein the side wall is bonded with the inner wall of the encapsulation casing, and the side wall covers an end surface of the encapsulation casing.

6. The battery according to claim 3, wherein the side wall crosses over an end surface of the encapsulation casing and is bonded with the outer wall of the encapsulation casing.

7. The battery according to claim 6, wherein the side wall envelops the end surface of the encapsulation casing in the sealing cover.

8. The battery according to claim 2, wherein an upper surface of the side wall is higher than an upper surface of the cover plate relative to a bottom of the encapsulation casing.

9. The battery according to claim 8, wherein the sealing cover further comprises a groove defined by the side wall and the cover plate.

10. The battery according to claim 9, wherein the groove has an upward opening and is configured to accommodate a hot press device therein, for hot-pressing the side wall with the encapsulation casing.

11. The battery according to claim 1, wherein the sealing cover comprises a cover plate, and the cover plate covers the opening of the encapsulation casing and an end surface of the encapsulation casing.

12. The battery according to claim 1, wherein the opening comprises a first opening and a second opening, the sealing cover comprises a first sealing cover and a second sealing cover, the first opening is sealed by the first sealing cover, and the second opening is sealed by the second sealing cover.

13. The battery according to claim 12, wherein the first sealing cover has a third opening, the battery cell comprises a tab, and the tab protrudes out of the third opening.

14. The battery according to claim 13, wherein two third openings are provided, the tab comprises a positive tab and a negative tab, the positive tab protrudes out of one of the two third openings, and the negative tab protrudes out of the other third opening.

15. The battery according to claim 13, wherein the third opening is provided in an edge of the first sealing cover.

16. The battery according to claim 15, wherein a part of the edge of the first sealing cover is recessed into the third opening along a direction perpendicular to a protruding direction of the tab.

17. The battery according to claim 13, further comprising a sealing adhesive, wherein the sealing adhesive is provided in the third opening and surrounds the tab.

18. The battery according to claim 1, wherein the encapsulation casing is configured as a hollow columnar member formed by a piece of membrane.

19. The battery according to claim 1, wherein the sealing cover further comprises a removable gripping portion, the removable gripping portion is configured to facilitate bonding the sealing cover with the encapsulation casing.

20. The battery according to claim 19, wherein the removable gripping portion comprises two cylinders, and the two cylinders are arranged on the sealing cover at interval.

* * * * *